United States Patent [19]

Naito et al.

[11] Patent Number: 5,054,570

[45] Date of Patent: Oct. 8, 1991

[54] CRUISE CONTROL APPARATUS FOR VEHICLE

[75] Inventors: Yasuo Naito; Hiroyuki Kouzuki, both of Himeji, Japan

[73] Assignee: Mitsubishi Denki Kabushiki Kaisha, Tokyo, Japan

[21] Appl. No.: 679,126

[22] Filed: Mar. 28, 1991

[30] Foreign Application Priority Data

Dec. 24, 1988 [JP] Japan .................... 63-327074

[51] Int. Cl.$^5$ ............................. B60K 31/00
[52] U.S. Cl. ................... 180/170; 180/179; 307/10.1; 340/441
[58] Field of Search ............ 180/170, 177, 179; 364/426.04; 200/61.89; 307/10.1; 340/441

[56] References Cited

U.S. PATENT DOCUMENTS

| | | | |
|---|---|---|---|
| 4,158,192 | 6/1979 | Muto | 180/177 |
| 4,158,398 | 6/1979 | Riddel | 180/177 |
| 4,312,419 | 1/1982 | Noddings | 180/177 |
| 4,313,515 | 2/1982 | Mann et al. | 180/179 |
| 4,345,653 | 8/1982 | Shields | 180/177 |
| 4,434,469 | 2/1984 | Suzuki et al. | 180/179 |
| 4,540,060 | 9/1985 | Kawata et al. | 180/179 |
| 4,934,476 | 6/1990 | Hyodo | 180/177 |

FOREIGN PATENT DOCUMENTS 63-327074 12/2488 Japan .
2033623 5/1980 United Kingdom ............... 180/179

*Primary Examiner*—Andres Kashnikow
*Assistant Examiner*—Eric Culbreth
*Attorney, Agent, or Firm*—Sughrue, Mion, Zinn, Macpeak and Seas

[57] ABSTRACT

A cruise control apparatus for a vehicle which is highly reliable and safe in operation. The cruise control apparatus includes a cruise control setting switch for setting cruise control; a first switch operatively connected with the brake system in such a manner that it turns on and off the power supply to a throttle actuator, which acts to control the opening degree of a throttle valve, in response to brake release and application, respectively; and a second switch for cancelling the setting of cruise control. The cruise control apparatus determines whether there is a fault in either one of the first and second switches which continues for more than a predetermined time when the vehicle is travelling at a speed higher than a predetermined level, and it inhibits the cruise control setting switch from setting cruise control when there is such a fault.

4 Claims, 2 Drawing Sheets

5,054,570

CRUISE CONTROL APPARATUS FOR VEHICLE

This is a continuation of application Ser. No. 454,826, filed Dec. 22, 1989, now abandoned.

BACKGROUND OF THE INVENTION

The present invention relates to a cruise control apparatus for a vehicle, and more particularly to such an apparatus which is capable of preventing cruise control from being set when certain conditions are met.

There has been known a conventional cruise control apparatus for a vehicle of the type in which the target speed at which the vehicle is to travel is determined as the speed of the vehicle sensed by a speed sensor at the instant when the operator turns on a cruise control switch. The target speed thus determined is then stored in a RAM in a microcomputer. Based on the present speed as continuously sensed by the speed sensor every second and the target speed, an amount of opening of a throttle valve in the intake manifold of the engine which corresponds to the target speed is calculated by the microcomputer. Then, the throttle valve is set to the thus calculated opening amount through the action of an actuator so that the speed of the vehicle is adjusted to the target speed. Thereafter, when the operator steps on a brake pedal for brake application, a stop lamp switch, which is operated upon brake application, is turned on to release or stop cruise control, and at the same time a brake switch is turned off to interrupt the supply of power from a source of electricity to the actuator. Subsequently, when the brake pedal is released, the stop lamp switch and the brake switch are operated to return to the initial condition so that the vehicle is ready for travelling under cruise control.

With the conventional cruise control apparatus constructed in the above manner, if either one of the stop lamp switch and the brake switch has failed, it is still possible to cancel cruise control. However, there is the problem that if both switches fail after the cruise control setting switch has been operated to set cruise control, it becomes impossible to cancel cruise control. The failure of either one of the stop lamp switch and the brake switch can be detected through the resulting disagreement in operational mode between these switches so that the setting of cruise control can be inhibited upon detection of such a failure. In this case, however, if there is disagreement between the operating points of these switches, as may occur when the operator lightly steps on the brake pedal, a failure in one of the switches will be detected, despite the fact that both of the switches operate without any problem, and thus the setting of cruise control will be incorrectly inhibited.

SUMMARY OF THE INVENTION

The present invention is intended to obviate the above problem encountered in the conventional cruise control apparatus.

An object of the present invention is to provide a novel and improved cruise control apparatus for a vehicle which is highly reliable and safe in operation.

A more specific object of the present invention is to provide a novel and improved cruise control apparatus for a vehicle in which erroneous inhibition of the setting of cruise control is avoided.

According to the present invention there is provided a cruise control apparatus for a vehicle having an engine with a throttle valve, a brake system and an actuator for controlling the opening degree of the throttle valve, the cruise control apparatus comprising:

a speed sensor for sensing the speed of a vehicle;

cruise control setting means for setting cruise control;

a first switch operatively connected with the brake system in such a manner that it turns on and off the power supply to the actuator in response to brake release and application, respectively; and a second switch for cancelling the setting of cruise control. The present invention further provides for a cruise control;

apparatus that includes a fault detecting means for detecting whether there is a fault in either one of the first and second switches which continues for more than a predetermined time when the speed of the vehicle sensed by said speed sensor is greater than a predetermined level, said fault detecting means generating a fault detection signal when such a fault is detected; and cruise control inhibiting means for inhibiting the cruise control setting means from setting cruise control when it receives the fault detection signal from the fault detecting means.

In one embodiment, the first switch is a brake switch which is turned on and off in response to brake release and application, whereas the second switch is a stop lamp switch which is turned on and off in response brake application and release.

The above and other objects, features and advantages of the present invention will become apparent from the following detailed description of presently preferred embodiments of the invention taken in conjunction with the accompanying drawings.

DESCRIPTION OF THE PREFERRED EMBODIMENTS

The present invention will now be described in detail with reference to a preferred embodiment thereof as illustrated in the accompanying drawings.

Figure 1:
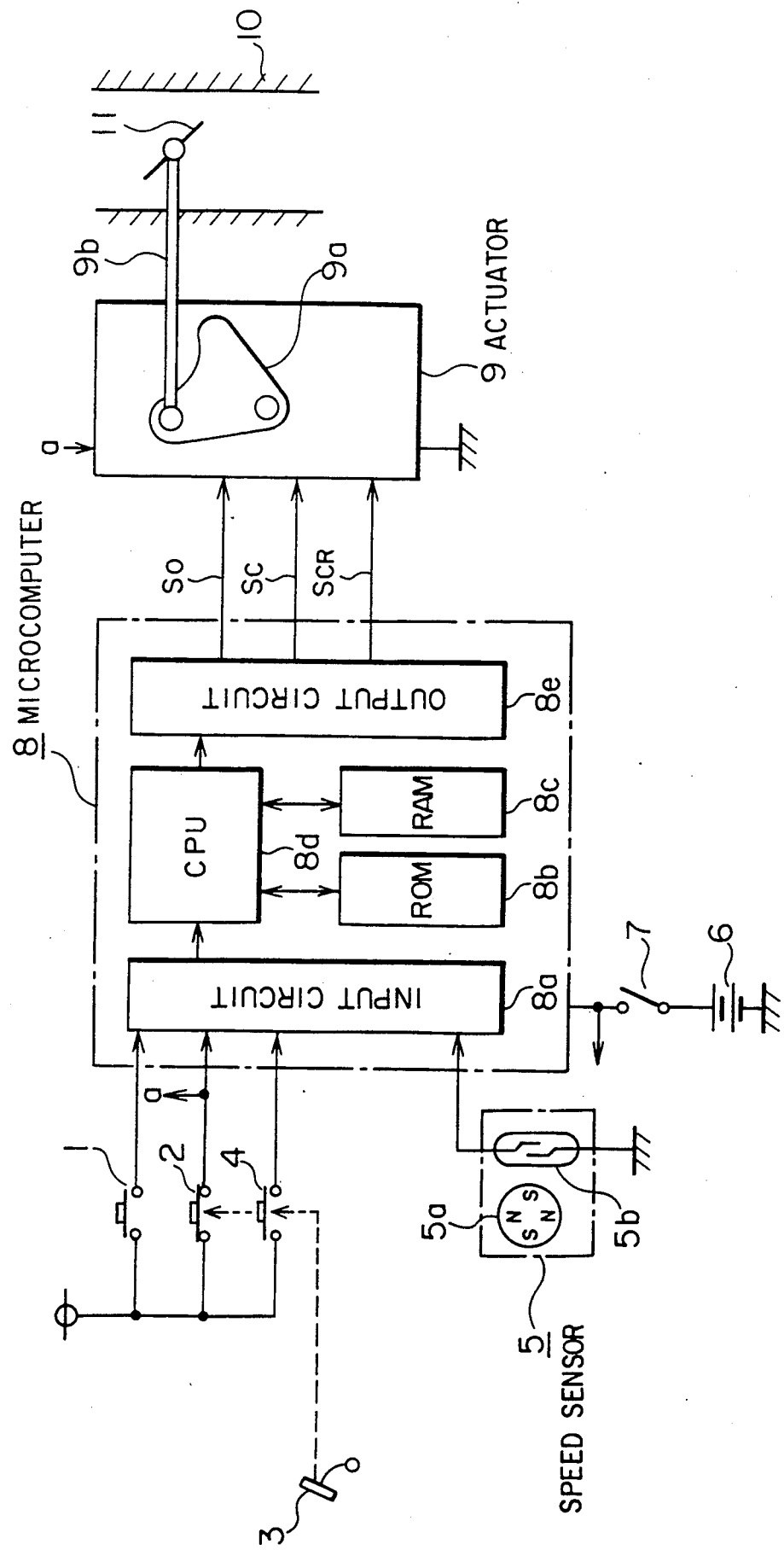
FIG. 1 is a schematic illustration showing the general construction of a cruise control apparatus for a vehicle in accordance with the present invention.

Referring to the drawings and first to FIG. 1, there is illustrated the general arrangement of a cruise control apparatus for a vehicle constructed in accordance with the present invention. The cruise control apparatus as illustrated includes a cruise control setting switch 1 which is adapted to be operated by an operator so as to start cruise control, a brake switch 2 which is operatively connected with a brake pedal 3 in such a manner that it is turned off to interrupt the electrical power supply to an actuator 9 (described in detail later) when the brake pedal 3 is stepped on, and a stop lamp switch 4 which is also operatively connected with the brake pedal 3 in such a manner that it is operated to release cruise control and light a tail lamp (not shown) when the brake pedal 3 is stepped on. The switches 1, 2 and 4 have one end commonly coupled to a source of electricity. A speed sensor 5 for sensing the speed of the vehicle includes a rotary member 5a with four magnetic poles and a reed switch 5b having one end grounded, the rotary member 5a being operatively connected with a transmission through a metering cable for rotation around its central axis so that the sensor 5 outputs a signal composed of a series of pulses with a frequency proportional to the speed at which the vehicle is running. A control unit 8 in the form of a microcomputer has a power supply terminal coupled to a source of electricity 6 through a power switch 7 in the form of a main switch.

Figure 2:
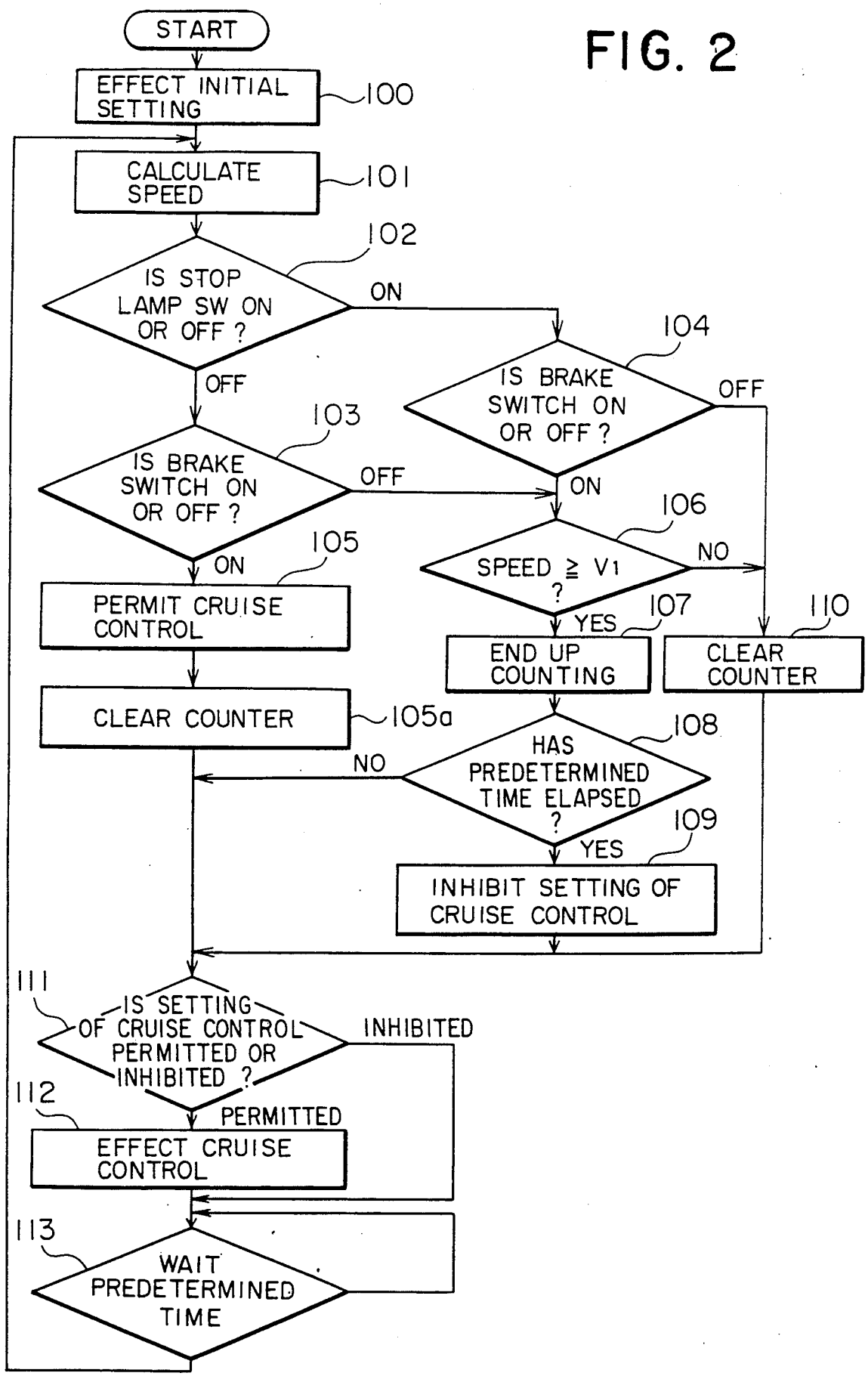
FIG. 2 is a flowchart showing the operational process executed by a CPU of a microcomputer illustrated in FIG. 1.

The microcomputer 8 has an input circuit 8a connected to receive the outputs of the cruise control setting switch 1, the brake switch 2, the stop lamp switch 4 and the speed sensor 5, a ROM 8b having a control program stored therein for executing an operational process as illustrated in FIG. 2, a RAM 8c serving as a working memory, a CPU 8d connected to the input circuit 8a for processing the output signals therefrom and effecting certain calculations and generating output signals, and an output circuit 8e connected to receive the output signals of the CPU 8d for outputting control signals to the exterior.

A throttle actuator 9, in the form of a well-known motor-driven type throttle actuator, receives the output signals of the output circuit 8e and in response thereto drivingly adjusts the opening degree of a throttle valve 11 disposed in an intake manifold 10 of an internal combustion engine. The throttle actuator 9 is operatively connected with an accelerator pedal (not shown) and includes a motor (not shown). The throttle actuator 9 has an arm or link 9a in the shape of a sector which is mounted at its center on a rotary shaft operatively connected with the output shaft of the motor for rotation therewith. The sector-shaped link 9a is connected at its peripheral point radially spaced from the center thereof with a rod 9b at its one end. The rod 9b is in turn connected at its other end with the throttle valve 11 in such a manner that the throttle valve 11 is forced to move in the closing or opening direction as the motor drives the sector-shaped link 9a to rotate in one or the other rotational direction. Though not illustrated, a clutch in the form of an electromagnetic clutch is housed in the actuator 9 at a location between the link 9a and the unillustrated motor for making and breaking the operative connection therebetween. The operation of the clutch is controlled by an electromagnetic clutch signal Scr which is outputted from the output circuit 8e of the microcomputer 8.

The operation of the above-described embodiment will next be described with reference to FIGS. 1 and 2. First, the operator turns on the main switch 7 so that power is supplied from the source of electricity 6 to the microcomputer 8. Thus, the microcomputer 8 starts to operate and process the output signal of the speed sensor 5, which is in the form of a series of pulses having a frequency proportional to the speed of the vehicle Vs. The microcomputer 8 calculates the frequency of the output pulses of the speed sensor 5 and calculates the speed of the vehicle based on the frequency thus calculated.

The microcomputer 8 determines, based on ON or OFF signals from the brake switch 2 and the stop lamp switch 4, whether the operations of these switches are normal. If the answer is "NO" and if the measured or calculated speed of the vehicle is greater than a predetermined level and continues for a time longer than a predetermined period, the microcomputer 8 operates to inhibit the setting of cruise control, but if otherwise, it makes the cruise control apparatus in a condition ready for cruise control where setting of cruise control is permitted. In this connection, it is to be noted that the normal or abnormal operations of the brake switch 2 and the stop lamp switch 4 are determined as follows:

| Condition | Brake SW 2 | Stop Lamp SW 4 | Results |
|---|---|---|---|
| A | ON | OFF | normal (brake released) |
| B | OFF | ON | normal (brake applied) |
| C | ON | ON | abnormal |
| D | OFF | OFF | abnormal |

If the setting of cruise control is permitted, when the operator turns on the cruise control setting switch 1, an ON signal is inputted from the setting switch 1 to the microcomputer 8 so that the speed Vs at which the vehicle is running at that time is stored in the RAM 8c as a target speed Vr and at the same time cruise control is started. The microcomputer 8 compares the actual speed Vs of the vehicle sensed by the speed sensor 5 with the target speed Vr and outputs a control signal from the output port 8e to the throttle actuator 9 whereby the actuator 9 is operated to properly adjust the opening degree of the throttle valve 11 so as to make the vehicle travel at the target speed Vr. Specifically, if the actual speed Vs is less than the target speed Vr, the microcomputer 8 generates a throttle opening drive signal So so as to increase the opening degree of the throttle valve 11 by a predetermined amount, whereas if the actual speed Vs is greater than the target speed Vr, the microcomputer 8 issues a throttle closing drive signal Sc so as to decrease the opening degree of the throttle valve 11 by a predetermined amount. As a result, the vehicle is automatically controlled to travel at a predetermined constant speed without the need of operator's accelerator pedal operation.

During the time when the vehicle is travelling under such cruise control, when the operator steps on the brake pedal 3, the stop lamp switch 4 in the form of a normally open type switch is turned on to send a cruise control release signal to the microcomputer 8, whereby the microcomputer 8 acts to release (disengage) the unillustrated electromagnetic clutch in the throttle actuator 9. At the same time, the brake switch 2 in the form of a normally closed type switch is turned off to interrupt the power supply to the throttle actuator 9. Thereafter, the opening degree of the throttle valve 9 is manually controlled by operator's accelerator pedal operation so as to adjust the speed of the vehicle.

On the other hand, the microcomputer 8 operates in the manner as shown in the flowchart of FIG. 2. Specifically, in Step 100, initial setting is effected, and in Step 101 the speed Vs of the vehicle is calculated based on the period between the adjacent pulses of the output signal of the speed sensor 5, the period being calculated by an interrupt routine which is executed every time the output signal in the form of a series of pulses of the speed sensor 5 rises. Then, in Step 102, it is determined whether the stop lamp switch 4 is turned on or off. If the answer is "OFF", the control process proceeds to Step 103 where it is further determined whether the brake switch 2 is turned on or off. On the other hand, if the answer is "ON" in Step 102, the control process proceeds to Step 104 where it is determined whether the brake switch 2 is turned on or off. In Step 103, if it is determined that the brake switch 2 is "ON", both the stop lamp switch 4 and the brake switch 2 are normal, and thus the control process proceeds to Step 105 where a cruise control flag in the RAM 8c is set to "1" for permitting the setting of cruise control. Thereafter, in Step 105a, a counter in the microcomputer 8 is cleared, and then the control process proceeds to Step 111. On the contrary, in Step 103, if it is determined that the brake switch 2 is "OFF", the control process proceeds to Step 106. Returning to Step 104, if it is determined that the brake switch 2 is "ON", the control process proceeds to Step 106, but if "OFF", to Step 110. Here, in the case where the control process proceeds from Step 101 to Step 110, the setting of cruise control is inhibited since there is the possibility that the brake pedal 3 will be released and both switches 2 and 4 returned to normal. If it is determined that the brake switch 2 is "ON" in Step 104, there is an abnormality in the operation of either one of the brake switch 2 and the stop lamp switch 4 Then, in Step 106 it is determined whether the speed Vs calculated in Step 101 is equal to or greater than a predetermined speed level $V_1$. If the answer is "YES", the counting of the Counter is halted in Step 107 and then the control process proceeds to Step 108 where it is determined whether the counted value of the counter is equal to or greater than a predetermined value, i.e., it is determined whether a predetermined time has elapsed. If the answer is "YES", then in Step 109 the cruise control flag in the RAM 8c is set to "0" for the purpose of inhibiting the setting of cruise control, and thereafter the control process proceeds to Step 111. On the other hand, if the answer is "NO" in Step 108, the control process proceeds to Step 111. Returning to Step 106, if the answer is "NO", then in Step 110 the counter is cleared and the control process proceeds to Step 111. In Step 111, it is determined whether the flag set in the RAM 8c is "1" or "0". If the answer is "1" (i.e., the setting of cruise control is permitted), the control process proceeds to Step 112 where cruise control processing is effected, that is, cruise control is set when a cruise control setting signal is inputted from the cruise control setting switch 1 to the CPU 8d through the input circuit 8a in cases where the vehicle is travelling without any cruise control. In this connection, however, if the vehicle has already been under cruise control, nothing is done in Step 112. After Step 112 or if the answer is "0" in Step 111 (i.e., the setting of cruise control is inhibited), the control process proceeds to Step 113 where it waits a predetermined time and then returns to Step 101. Thereafter, the same operational steps as described above are repeated.

Here, it is to be noted that the setting of cruise control as effected in Step 112 is well known and has already been briefly described with reference to FIG. 1, and therefore a detailed explanation thereof is omitted.

In the above-described embodiment, the throttle actuator 9 is implemented as a motor-driven actuator, but any known type of actuator such as a vacuum-operated actuator having two electromagnetic valves for introducing an engine intake pressure and the atmospheric pressure, may be employed with the same results.

What is claimed is:

1. A cruise control apparatus for a vehicle having an engine with a throttle valve, a brake system and an actuator for controlling the opening degree of the throttle valve, said cruise control apparatus comprising:
    a speed sensor for sensing the speed of a vehicle;
    cruise control setting means for setting cruise control;
    a first switch (2) operatively connected with the brake system in such a manner that it turns on and off the power supply to the actuator in response to brake release and application, respectively;
    a second switch (4) for cancelling the setting of cruise control;
    fault detecting means for detecting a fault in either one of said first and second switches when said fault continues for more than a time period sufficient to determine that an application of the brake is not inadvertent and when the speed of the vehicle sensed by said speed sensor is greater than a predetermined non-zero level, said fault detecting means generating a fault detection signal when such a fault is detected; and
    cruise control inhibiting means for inhibiting said cruise control setting means from setting cruise control when it receives the fault detection signal from said fault detecting means.

2. A cruise control apparatus according to claim 1, wherein said second switch is a stop lamp switch which is turned on and off in response brake application and release.

3. A cruise control apparatus according to claim 1, wherein said first switch is a brake switch which is turned on and off in response to brake release and application.

4. A cruise control apparatus according to claim 3, wherein said second switch is a stop lamp switch which is turned on and off in response brake application and release.

* * * * *